(No Model.) 2 Sheets—Sheet 1.
W. A. KNOWLTON.
MOWING MACHINE.
No. 525,219. Patented Aug. 28, 1894.
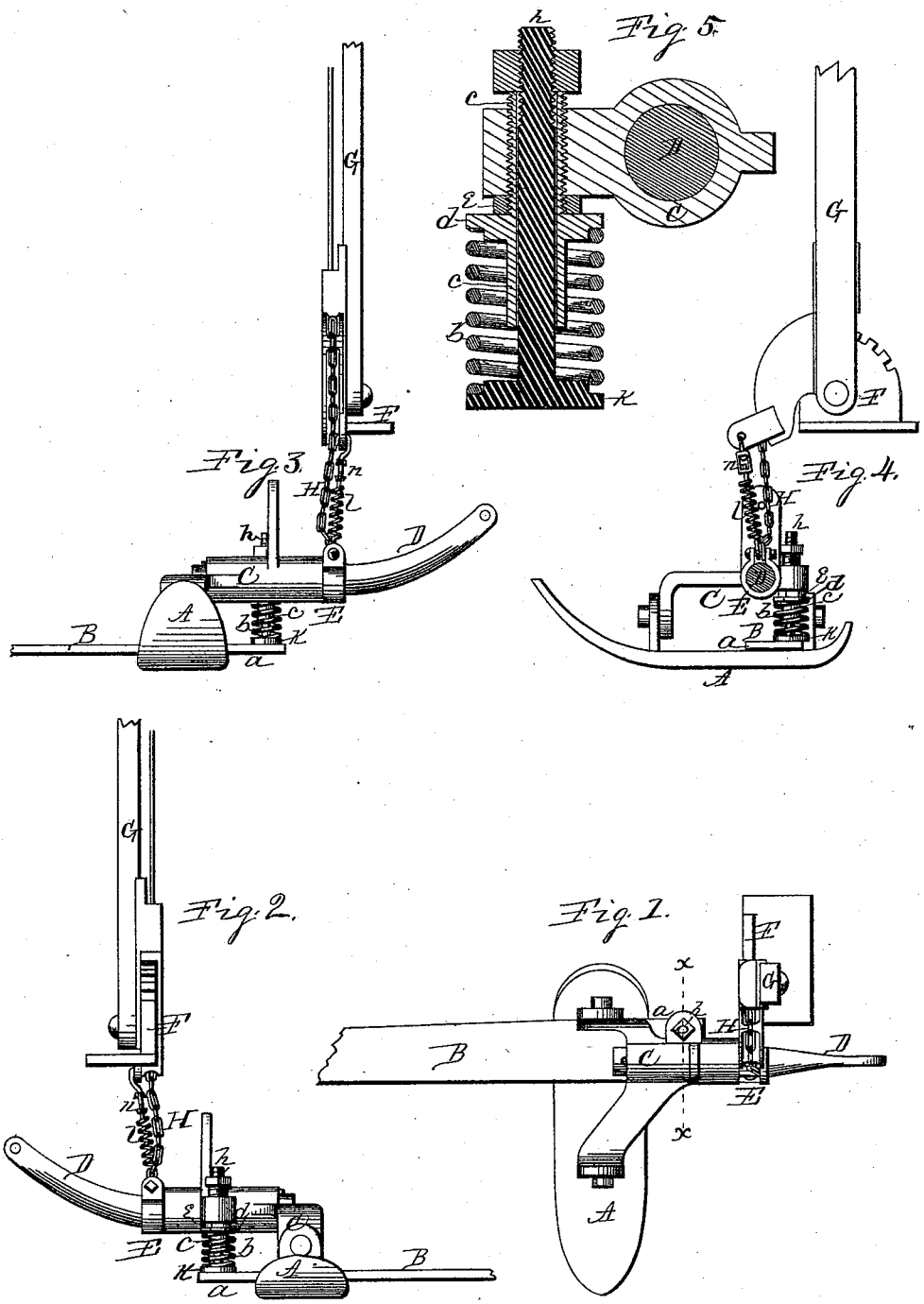
Witnesses.
A. O. Behel
A. C. Brearley
Inventor.
William A. Knowlton.
Per Jacob Behel.
Atty.

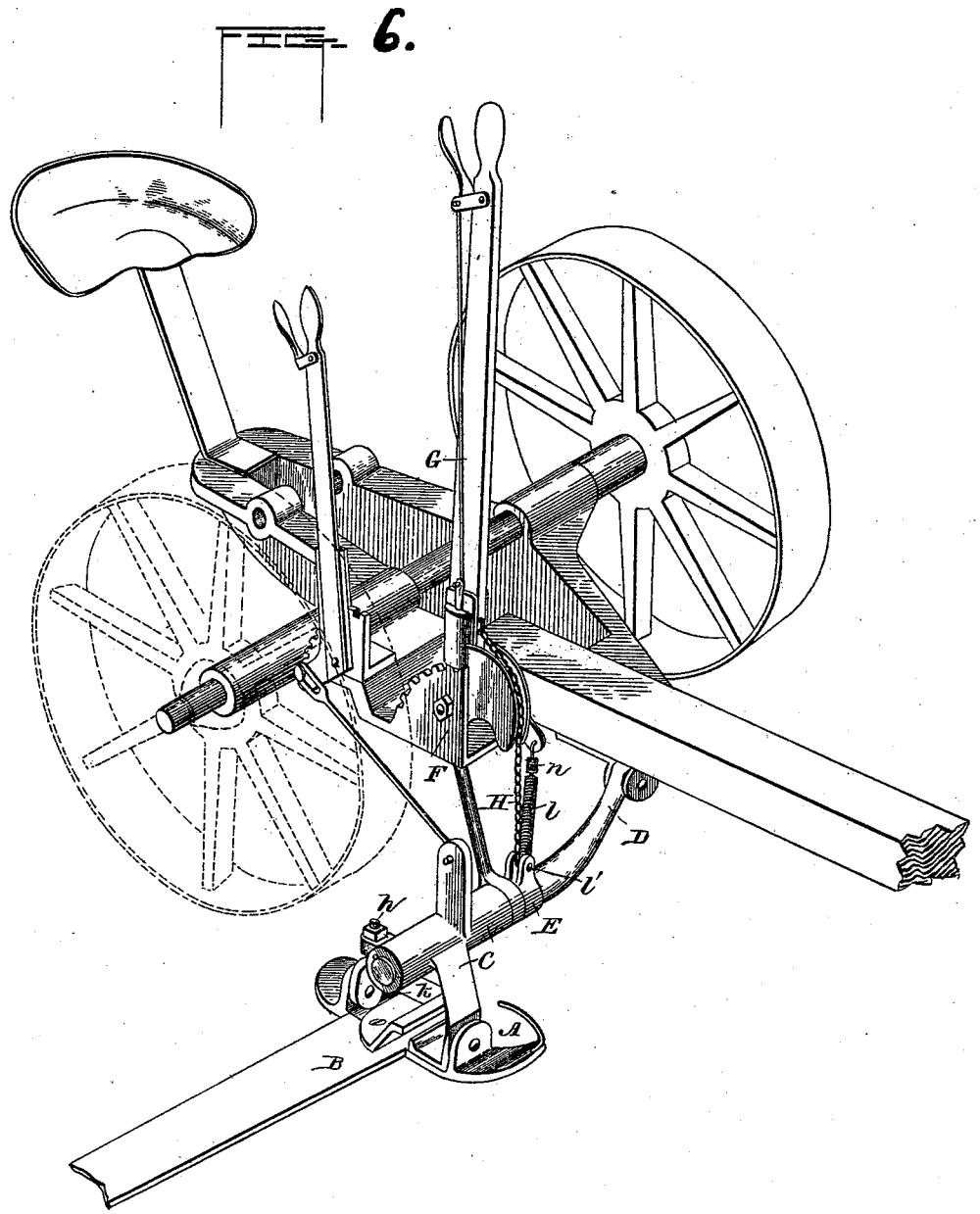

UNITED STATES PATENT OFFICE.

WILLIAM A. KNOWLTON, OF ROCKFORD, ILLINOIS, ASSIGNOR, BY MESNE ASSIGNMENTS, TO MATILDA T. KNOWLTON, OF SAME PLACE.

MOWING-MACHINE.

SPECIFICATION forming part of Letters Patent No. 525,219, dated August 28, 1894.

Application filed August 31, 1885. Serial No. 175,847. (No model.)

*To all whom it may concern:*

Be it known that I, WILLIAM A. KNOWLTON, a citizen of the United States, residing at Rockford, in the county of Winnebago and State of Illinois, have invented certain new and useful Improvements in Mowing-Machines, of which the following is a specification.

This invention relates to mowing machines of a class known as the two-wheeled machines; its object is to reduce the ground friction of the cutting apparatus, lessen the draft, and the side draft of the machine, and increase its cutting power without adding to its weight.

It consists in mechanism by which a portion of the weight of the cutting apparatus when working, is transferred to the wheeled carrying frame. To accomplish these objects I have designed and constructed the apparatus represented in the accompanying drawings, in which—

Figure 1, is a plan view of portions of a mowing machine with my improvements in place thereon. Fig. 2, is a rear elevation. Fig. 3, is a front elevation. Fig. 4, is an inner end elevation. Fig. 5, is a vertical section on dotted line 1, on Fig. 1, drawn on an enlarged scale to more clearly show the construction. Fig. 6, is an isometrical representation of a mowing machine showing the application of my improvements.

The several parts represented in the figures consisting of the shoe A, finger bar B, fixed to the shoe; yoke C, hinge jointed to the shoe, coupling bar D, having a swivel connection with the yoke, clip E, embracing the coupling bar; segment ratchet F, fixed on the supporting frame; lifting and holding lever G, with its spring actuated detent to engage the ratchet teeth, pivoted to the segment ratchet, and a lifting chain H, connecting the coupling bar with the lever are in every particular substantially the same as like parts in a mowing machine for which Letters Patent No. 314,186 were issued to me March 17, 1885. In this instance however the heel or inner end $a$, of the finger bar extends over the shoe inward for a purpose hereinafter to appear. An open coiled or compression spring $b$, is placed between the inward projecting end of the finger bar and the coupling bar between its pivotal connection with the cutting apparatus and with the supporting frame, and by means of its spring action serves as a counter balance to support the cutting apparatus properly balanced on its hinged connection with the coupling bar to sustain the divider or free end of the cutting apparatus, in a manner to insure its proper action in cutting, and relieve it from undue ground friction. In order to produce the best results, the counterbalance spring $b$, is made adjustable in its connection with the coupling bar to vary its spring force, to reduce the ground pressure of the free or divided end of the cutting apparatus to its least practical point. For this purpose as one means of adjustment I have constructed the spring support with a thimble $c$, provided with a spring supporting collar $d$, and having a screw thread connection with the coupling, to permit endwise adjustment, and a jam nut $e$, to fix it in place when adjusted. The counterbalance spring $b$, is placed on the depending end of the thimble and a screw bolt $h$, with a spring supporting washer head $k$, is passed upward through the spring and thimble, and a screw nut on its upward projecting end holds the parts in place, and serves to adjust the force of the spring by clamping it with greater or less force between the washer head $k$, and the collar $d$. The screw thread connection of the thimble with the coupling, furnish the means to adjust the spring relatively with the finger bar and the coupling, to support the cutting apparatus properly balanced. A close coil or tension spring $l$, is connected at one end to the coupling bar or other part of the coupling, between the hinge joint connection of the coupling bar with the supporting frame, and the hinge joint connection of the finger bar with the yoke $c$, and its other end is connected with the lifting and holding lever mounted on the supporting frame. The tension spring $l$, is provided with a swivel screw link $n$, for lengthwise adjustment to regulate its length relatively with the length of the lifting chain and adjust its lifting force to sustain all that portion of the cutting apparatus not required to hold it in working contact with the ground, and transfer it onto the carrying wheels, to increase their traction, add to the cutting power of the machine, lessen its direct and side draft and render the machine more efficient. The relative length of the tension spring $l$, and the lifting chain H, and their connection with the coupling, and with the lifting and holding lever are such that when by means of the lever the cutting apparatus is adjusted to its working position the lifting chain H, will be slack, and the cutting apparatus will be supported in a flexible manner on the tension spring, to float upon the ground with the least practical weight.

When it is required to lift the cutting apparatus or to support it elevated, the tension spring will yield until the lifting chain receives the weight, when the spring will be relieved from further strain. Instead of connecting the tension spring at its upper end to the lifting and holding lever it may be connected with the supporting frame directly or indirectly and made adjustable in its connection to regulate its holding force.

The foregoing improvements are capable of use in both front and rear cut machines, but some of them are more especially adapted to the front or forward cut machine.

In the drawings I have only represented the parts of a mowing machine with which my improvements are directly connected and the several parts necessary to a complete machine not shown or herein described, may be any of the varieties known capable of use in connection with my improvements.

I claim as my invention—

1. In a mowing machine, a counterbalance spring located between the cutting apparatus and the coupling bar at a point inward of their hinge connection said spring made adjustable in its connection with the coupling bar relatively with the cutting apparatus and adapted to be separately adjustable to vary its tension, substantially as set forth.

2. In a mowing machine, the combination with the cutting apparatus and coupling bar, of a counterbalance spring, a thimble carrying a collar and having an adjustable connection with the coupling bar, and a headed screw bolt and nut, substantially as described.

3. The combination of a mowing machine, of a counterbalance spring located between the cutting apparatus and the coupling bar inward of their hinge connection, and devices for vertically adjusting the spring bodily and independent devices for varying the tension of the spring, substantially as described.

4. The combination with the coupling bar having a hinge joint connection with the cutting apparatus and connected with the supporting frame, a lifting and holding lever of a spring support connecting the coupling bar with the lifting and holding lever, said support being independent of the lifting chain, substantially as and for the purpose set forth.

5. The combination with the coupling bar of the cutting apparatus, and with the lifting and holding lever, of a lifting chain and a supporting spring, said chain and spring independently connecting the coupling bar with the adjusting lever, substantially as and for the purpose set forth.

6. The combination with the coupling bar and cutting apparatus having a hinge joint connection, and with the supporting frame, of a lifting chain and a supporting spring independently connecting the coupling bar with the adjusting lever, said spring made adjustable lengthwise, substantially as described.

7. The combination of the main frame, the coupling mechanism, the cutting apparatus, a lifting lever, intermediate mechanism connecting the lever with the coupling mechanism, a spring adapted to counterbalance the free end of the cutting apparatus, and a spring adapted to support both the coupling mechism and cutting apparatus, the said supporting spring having end connections independent of the said intermediate mechanism.

WILLIAM A. KNOWLTON.

Witnesses:
DAVID N. STARR,
A. O. BEHEL.